United States Patent
Bar-El et al.

(10) Patent No.: US 7,467,304 B2
(45) Date of Patent: Dec. 16, 2008

(54) SYSTEM, DEVICE, AND METHOD OF SELECTIVELY ALLOWING A HOST PROCESSOR TO ACCESS HOST-EXECUTABLE CODE

(75) Inventors: Hagai Bar-El, Rehovot (IL); David Deitcher, Jerusalem (IL); David Voschina, Givatayim (IL); Eran Rippel, Givatayim (IL)

(73) Assignee: Discretix Technologies Ltd., Netanya (IL)

( * ) Notice: Subject to any disclaimer, the term of this patent is extended or adjusted under 35 U.S.C. 154(b) by 0 days.

(21) Appl. No.: 11/472,539

(22) Filed: Jun. 22, 2006

(65) Prior Publication Data

US 2006/0294513 A1 Dec. 28, 2006

Related U.S. Application Data

(60) Provisional application No. 60/692,575, filed on Jun. 22, 2005.

(51) Int. Cl.
*G06F 11/30* (2006.01)
*G06F 12/14* (2006.01)
*H04L 9/32* (2006.01)

(52) U.S. Cl. .................. 713/187; 713/164; 713/168; 713/188; 713/193; 713/2; 726/22

(58) Field of Classification Search .................. 713/193, 713/188, 187, 164, 168; 726/22
See application file for complete search history.

(56) References Cited

U.S. PATENT DOCUMENTS

| | | | | |
|---|---|---|---|---|
| 4,683,532 | A * | 7/1987 | Yount et al. | 714/38 |
| 5,191,608 | A * | 3/1993 | Geronimi | 713/187 |
| 5,410,699 | A * | 4/1995 | Bealkowski et al. | 713/2 |
| 6,256,676 | B1 * | 7/2001 | Taylor et al. | 709/246 |
| 2002/0004905 | A1 * | 1/2002 | Davis et al. | 713/193 |
| 2005/0076228 | A1 * | 4/2005 | Davis et al. | 713/188 |
| 2006/0112266 | A1 * | 5/2006 | Little et al. | 713/161 |
| 2006/0179324 | A1 * | 8/2006 | Hatakeyama | 713/187 |

* cited by examiner

*Primary Examiner*—Benjamin E. Lanier
*Assistant Examiner*—Samson B Lemma
(74) *Attorney, Agent, or Firm*—EMPK & Shiloh, LLP

(57) ABSTRACT

Some demonstrative embodiments of the invention include a method, device and/or system of selectively allowing a host processor to access a host-executable code. A host apparatus may include, for example, a host processor; and a protected memory module comprising: a memory to maintain a host-executable code to be executed by the host processor; and a memory controller to authenticate the host-executable code, and to selectively allow the host processor to access the host-executable code based on an authenticity of the host-executable code. Other embodiments are described and claimed.

14 Claims, 4 Drawing Sheets

SYSTEM, DEVICE, AND METHOD OF SELECTIVELY ALLOWING A HOST PROCESSOR TO ACCESS HOST-EXECUTABLE CODE

CROSS REFERENCE TO RELATED APPLICATIONS

This application claims priority of U.S. Provisional Application No. 60/692,575, filed Jun. 22, 2005, the entire disclosure of which is incorporated herein by reference.

BACKGROUND OF THE INVENTION

A host apparatus may implement a protection mechanism to provide a trustworthy operating environment, e.g., by assuring that the host only executes trustworthy code.

Conventional protection mechanisms may include adapting a host processor, e.g., by hardware modifications, to perform a host-based secure Boot process to load only trustworthy code. The adaptation of the host processor may be complex and/or expensive.

SUMMARY OF SOME DEMONSTRATIVE EMBODIMENTS OF THE INVENTION

Some demonstrative embodiments of the invention include a method, device and/or system of selectively allowing a host processor to access a host-executable code.

According to some demonstrative embodiments of the invention, a host apparatus may include a host processor; and a protected memory module. The protected memory module may include, for example, a memory to maintain a host-executable code to be executed by the host processor; and a memory controller to authenticate the host-executable code, and to selectively allow the host processor to access the host-executable code based on an authenticity of the host-executable code.

According to some demonstrative embodiments of the invention, the host-executable code may include a boot code to be executed by the host processor during a boot process, and an application code to be executed by the host processor after executing the boot code. The memory controller may authenticate the boot code and disable access to the secure memory if the boot code is not authenticated.

According to some demonstrative embodiments of the invention, the protected module may maintain a boot code authentication value corresponding to the boot code. The memory controller may authenticate the boot code based on the boot code authentication value.

According to some demonstrative embodiments of the invention, the boot code, when executed by the host processor, may result in causing the controller to authenticate the application code, and to allow the host processor to access the application code only if the application code is authentic.

According to some demonstrative embodiments of the invention, the protected module may maintain a validation indicator. The controller may set the indicator to indicate whether the application code is authentic. The boot code, when executed by the host processor, may result in causing the host processor to wait until the controller sets the indicator.

According to some demonstrative embodiments of the invention, the host-executable code may include an update code to allow updating of the host-executable code. The controller may authenticate the update code and allow the host processor to access the update code only if the update code is authentic. The boot code may result, when executed by the host processor, in causing the host processor to execute the update code.

According to some demonstrative embodiments of the invention, the host-executable code may include a functional code to be executed by the host processor at least during a boot process. The memory controller may authenticate the functional code, disable access to the host-executable code at least until the functional code is authenticated, and/or allow the host processor to access the functional code only if the functional code is authentic.

According to some demonstrative embodiments of the invention, the memory controller may provide the host processor with only a predefined code at least until the functional code is authenticated. The predefined code, when executed by the host processor, may result in causing the host processor to wait at least until the functional code is authenticated.

According to some demonstrative embodiments of the invention, the protected module may maintain a functional code authentication value corresponding to the functional code. The memory controller may authenticate the functional code based on the functional code authentication value.

According to some demonstrative embodiments of the invention, the host-executable code may include an update code to allow updating of the host-executable code. The memory controller may authenticate the update code and disable access to the host-executable code at least until the update code is authenticated.

According to some demonstrative embodiments of the invention, the memory controller may cause the host processor to execute the update code if the functional code is not authentic and the update code is authentic.

According to some demonstrative embodiments of the invention, the protected module may maintain an update code authentication value corresponding to the update code. The memory controller may authenticate the update code based on the update code authentication value.

According to some demonstrative embodiments of the invention, the host-executable code may include a functional code to be executed by the host processor during at least a boot process. The memory controller may authenticate the functional code and allow the host processor to perform only a read operation on the functional code at least until the functional code is authenticated.

According to some demonstrative embodiments of the invention, the memory controller may provide the host processor with only a predefined code if the functional code is not authentic.

According to some demonstrative embodiments of the invention, the protected module may maintain a functional authentication value corresponding to the functional code. The memory controller may authenticate the functional code based on the functional authentication value.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
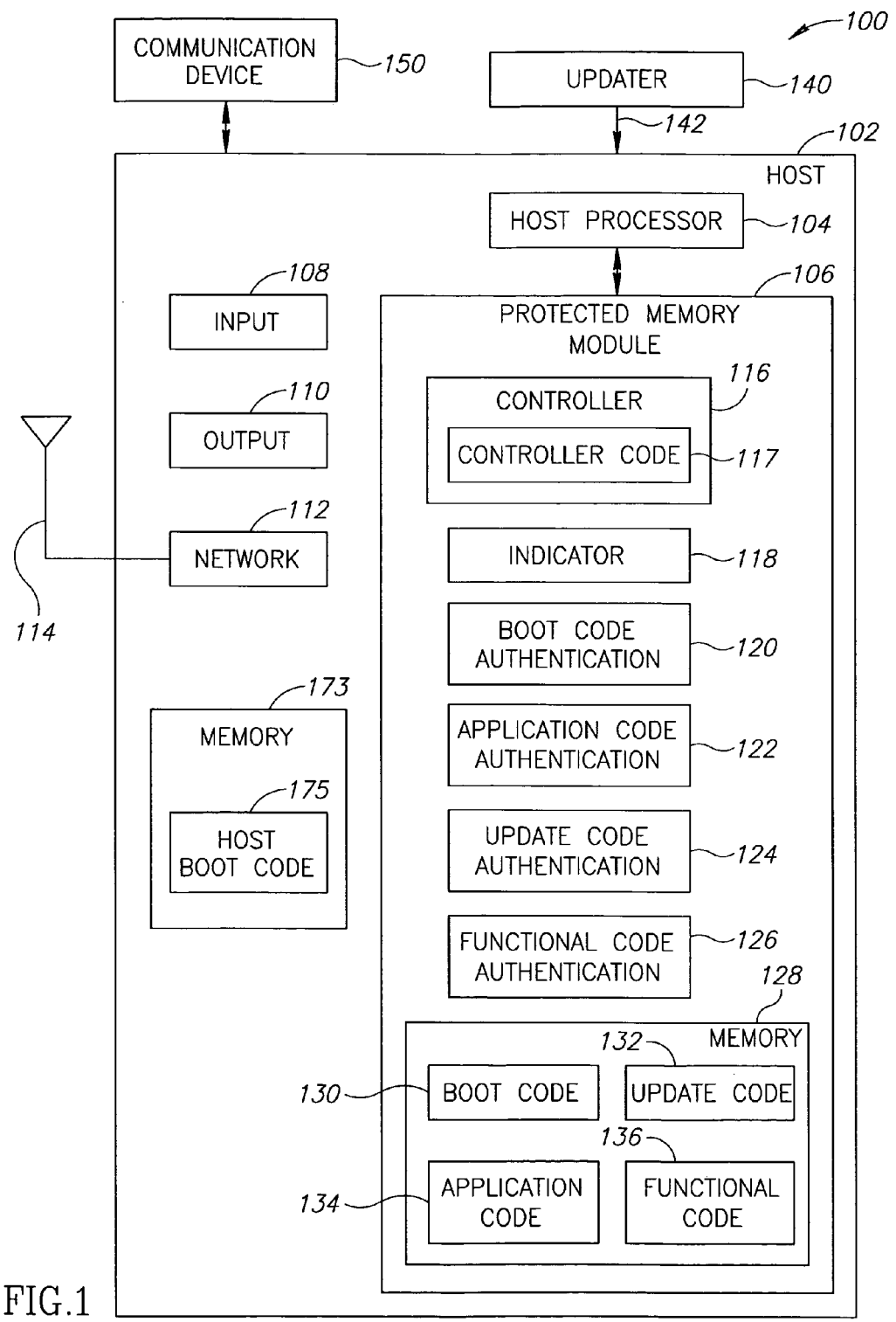
FIG. 1 is a schematic illustration of a system including a host having a protected memory module according to some demonstrative embodiments of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art. An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the present invention may include apparatuses for performing the operations herein. These apparatuses may be specially constructed for the desired purposes, or they may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, a Dynamic RAM (DRAM), a Synchronous DRAM (SD-RAM), a Flash memory, a volatile memory, a non-volatile memory, a cache memory, a buffer, a short term memory unit, a long term memory unit, or any other type of media suitable for storing electronic instructions, and capable of being coupled to a computer system bus.

Part of the discussion herein may relate, for demonstrative purposes, to executing and/or accessing code. However, embodiments of the invention are not limited in this regard, and may include, for example, executing and/or accessing one or more instructions, one or more commands, or the like.

Some demonstrative embodiments of the invention may include a method, device and/or system to selectively allow a host processor to access and/or execute code maintained in a protected module. The protected module may include, for example, a memory to maintain host-executable code; and a memory controller to authenticate at least part of the host-executable code, and selectively allow the host processor to execute and/or access the host-executable code, based on an authenticity of the host-executable code.

The devices, systems and/or methods according to some demonstrative embodiments of the invention may enable providing the host with a trustworthy operating environment, e.g., by assuring that the host only executes trustworthy code, without, for example, requiring that the host and/or host/processor be trustworthy. Accordingly, the devices, systems and/or methods according to some demonstrative embodiments of the invention may enable providing the host with a trustworthy operating environment without adapting the host processor to perform a host-based secure Boot process.

Reference is made to FIG. 1, which schematically illustrates a system 100 according to some demonstrative embodiments of the invention.

According to some demonstrative embodiments of the invention, system 100 may include a host 102. Although the present invention is not limited in this respect, host 102 may include or may be a portable device. Non-limiting examples of such portable devices include mobile telephones, cellular handsets, laptop and notebook computers, personal digital assistants (PDA), and the like. For example, host 102 may include or may be cellular handset. Alternatively, host 102 may be a non-portable device, e.g., a personal computer, a server computer, or the like.

According to some demonstrative embodiments of the invention, host 102 may include a host processor 104 and a protected memory module 106, as are described in detail below. Host 102 may also include an input 108, an output 110, a memory 173, and/or a network connection 112, e.g., as are all described in detail below.

Although the present invention is not limited in this respect, protected module 106 may be integrally connected to, or included within host 102. For example, host 102 may include, or may be, a mobile telephone or a cellular handset; and module 106 may include or may be, for example, a memory, e.g., a Flash memory, connected to or embedded within the mobile telephone or handset.

According to some demonstrative embodiments of the invention, host processor 104 may include a Central Processing Unit (CPU), a Digital Signal Processor (DSP), a microprocessor, a plurality of processors, a controller, a chip, a microchip, or any other suitable multi-purpose or specific processor or controller. Input 108 may include, for example, a keyboard, a mouse, a touch-pad, or other suitable pointing device or input device. Output 110 may include, for example, a Liquid Crystal Display (LC D), or any other suitable monitor or display. Network connection 112 may be adapted to interact with a communication network. Although the scope of the present invention is not limited in this respect, the communication network may include a cellular communication network, with host 102 being, for example, a cellular handset. The cellular communication network, according to some embodiments of the invention, may be a $3^{rd}$ Generation Partnership Project (3GPP), such as, for example, Frequency Domain Duplexing (FDD), Global System for Mobile communications (GSM), Wideband Code Division Multiple Access (WCDMA) cellular communication network and the like. Although the invention is not limited in this respect, network connection 112 may include, for example, at least one antenna 114 to transmit and/or receive signals to/from the communication network. Although the invention is not limited in this respect, system 100 may also include, for example, any suitable communication device 150, e.g., another host, to communicate with host 102, e.g., over a wireless or wired connection, as are well known in the art.

According to some demonstrative embodiments of the invention, memory 173 may include, for example, a ROM, or any other suitable, e.g., non-volatile, memory. Memory 173 may maintain, for example, host-maintained boot code 175 to be executed by host processor 104 during a Boot process of host 102, e.g., as described below.

According to demonstrative embodiments of the invention, protected memory module 106 may include any suitable protection mechanism, e.g., any suitable "physical" protection structure and/or any other suitable protection configuration as is known in the art, to prevent unauthorized disclosure of the contents of module 106; to prevent an attempt to access any part of the contents of module 106; to prevent an attempt to tamper or alter the contents of module 106, in part or in whole; and/or to prevent an attempt to interfere with the operation of module 106. It will be appreciated that the term "preventing unauthorized disclosure of stored data" as used herein may refer to ensuring the stored data may not be understood without authorization, for example, even if access, e.g., partial or complete physical and/or electronic access, to the stored data is obtained. It will also be appreciated that the term "securely maintaining data" as used herein may refer to maintaining data, while preventing unauthorized disclosure of the maintained data.

According to some demonstrative embodiments of the invention, protected memory module 106 may include a memory 128, and a memory controller 116 able to selectively allow access to memory 128, as described in detail below. For example, controller 116 may selectively allow host processor 104 access to memory 128, e.g., as described in detail below.

According to some demonstrative embodiments of the invention, controller 116 may include, for example, a processor, a Central Processing Unit (CPU), a Digital Signal Processor (DSP), a microprocessor, a plurality of processors, a chip, a microchip, or any other suitable multi-purpose or specific processor or controller. Memory 128 may include, for example, a Flash memory, e.g., an embedded Flash memory, a micro-drive, a hard-disk, or any other suitable, e.g., non-volatile, memory or storage.

According to some demonstrative embodiments of the invention, memory 128 may maintain host-executable code to be executed by host processor 104. The host-executable code may include, for example, one or more of a protected host-executable boot code 130, a protected host-executable update code 132, a protected host-executable application code 134, and a protected host-executable functional code 136, as are described in detail below.

According to some demonstrative embodiments of the invention, boot code 130 may include code to be executed by host processor 104 during the Boot process. Although the invention is not limited in this respect, host processor 104 may execute host boot code 175 at the beginning of the Boot process of host 102, e.g., before executing any other code. Host boot code 175 may include, e.g., at the end of host boot code 175, an instruction resulting in host processor 104 attempting to access boot code 130, e.g., immediately after executing host boot code 175. For example, boot code 130 may be maintained at a predefined boot-code address of memory 130, and host boot code 175 may include, e.g., at the end of host boot code 175, a command to proceed or branch to the predefined boot address of memory 130. Although the invention is not limited in this respect, controller 116 may allow performing only a read operation on boot code 130, for example, during the Boot process, e.g., as described below.

According to some demonstrative embodiments of the invention, application code 134 may include code to be executed by host processor 104 after executing boot code 130. Application code 134 may be intended to be executed during the Boot process and/or during an operation mode following the Boot process. Application code 134 may include any suitable code, e.g., resulting in any suitable program, process or application to be performed by host processor 104. For example, application code may result in an Operating System (OS), e.g., as is known in the art.

According to some demonstrative embodiments of the invention, update code 132 may include code, which when executed by host processor 104, may result in enabling updating of the contents of memory module 106, e.g., as described in detail below. For example, update code 132, when executed by host processor 104, may result in causing host processor 104 to update boot code 130, update code 132, application code 134, and/or functional code 136, based on an update request 142, which may be received, for example, from an updater 140. Update code 132 may cause host processor, for example, to authenticate and/or validate the update request, e.g., using any suitable validation and/or authentication algorithm or method, e.g., as are well known in the art.

According to some demonstrative embodiments of the invention, functional code 136 may include any suitable code to be executed by host processor 104 at least during the Boot process, e.g., as described in detail below. Although the invention is not limited in this respect, functional code 136 may include at least part of boot code 130, application code 134, and/or any other suitable code.

According to some demonstrative embodiments of the invention, memory module 106 may also include at least one boot code authentication value 120, corresponding to boot code 130; at least one update code authentication value corresponding to update code 132; at least one application code authentication value 122, corresponding to application code 134; at least one update code authentication value 124 corresponding to update code 132; and/or at least one functional code authentication value 126 corresponding to functional code 136. For example, boot code authentication value 120 may include an authentication value corresponding to a trusted version of boot code 130; application code authentication value 122 may include an authentication value corresponding to a trusted version of application code 134; update authentication value 124 may include an authentication value corresponding to a trusted version of update code 136; and/or functional code authentication value 126 may include an authentication value corresponding to a trusted version of functional code 136. The phrase "trusted code" as used herein may refer to code, which may be determined, assumed, presumed, and/or recognized to be authorized code, certified code, approved code, and/or code that may not harm, destroy, and/or attack host 102 and/or any other element or component of system 100. Accordingly, the phrase "non-trusted code" as used herein may refer to code, which is not determined, assumed, presumed, and/or recognized to be authorized code, certified code, approved code, and/or code that may not harm, destroy, and/or attack host 102 and/or any other element or component of system 100.

According to some demonstrative embodiments of the invention, performing one or more operations according to embodiments of the invention, e.g., as described below with reference to FIGS. 2, 3 and/or 4, may result in host 102 operating in an operating environment which may be assumed to be trustworthy. Although the invention is not limited in this respect, the trusted boot code, trusted application code, trusted update code, and/or trusted functional code may be provided to protected memory module 106 and/or stored in memory 128 by any suitable application, unit, or module, e.g., when host 102 is operating in the trustworthy operating environment, and/or by an update process resulting from executing update code 132.

According to some demonstrative embodiments of the invention, controller 116 may authenticate boot code 130 based on boot code authentication value 120. For example, controller 116 may calculate a boot authentication value based on boot code 130 ("the calculated boot authentication value"), and compare the calculated boot authentication value to boot authentication value 120. Controller 116 may determine boot code 130 is authentic if, for example, the calculated boot authentication value matches value 120. Controller 116 may authenticate application code 134 based on application code authentication value 122. For example, controller 116 may calculate an application authentication value based on application code 134 ("the calculated application authentication value"), and compare the calculated application authentication value to application authentication value 122. Controller 116 may determine application code 134 is authentic if, for example, the calculated application authentication value matches value 122. Controller 116 may authenticate functional code 136 based on functional code authentication value 126. For example, controller 116 may calculate a functional authentication value based on application code 136 ("the calculated functional authentication value"), and compare the calculated functional authentication value to functional authentication value 126. Controller 116 may determine functional code 136 is authentic if, for example, the calculated functional authentication value matches value 126. Controller 116 may authenticate update code 132 based on update code authentication value 124. For example, controller 116 may calculate an update authentication value based on update code 132 ("the calculated update authentication value"), and compare the calculated update authentication value to update authentication value 124. Controller 116 may determine update code 132 is authentic if, for example, the calculated update authentication value matches value 124.

According to some demonstrative embodiments of the invention, authentication values 120, 122, 124, and/or 126 may include any suitable authentication values. Although the invention is not limited in this respect, one or more of authentication values 120, 122, 124 and/or 126 may include, for example, a Hash value. For example, value 120 may include a Hash value calculated based on the trusted boot code; value 122 may include a Hash value calculated based on the trusted application code; value 124 may include a Hash value calculated based on the trusted update code; and/or value 126 may include a Hash value calculated based on the trusted functional code. Accordingly, controller 116 may calculate a hash value based on boot code 130, a hash value based on application code 134, a hash value based on update code 132, and/or a hash value based on functional code 136. The authentication values may be determined using any suitable authentication hardware and/or software, e.g., a S-1 cryptographic engine as is known in the art.

According to some demonstrative embodiments of the invention, protected memory module 106 may also include a validation indicator 118 to indicate whether application code 134 is determined to be authentic. Controller 116 may set a value of indicator 118 based, for example, on the authenticity of code 134. Although the invention is not limited in this respect, indicator 118 may be implemented, for example, by a value maintained at a predefined indicator address of memory 128 or in a controller memory (not shown) associated with controller 116. For example, controller 116 may set indicator 118 to have a first value, e.g., zero, indicating code 134 is not determined to be authentic; or a second value, e.g., one, indicating code 134 is determined to be authentic.

Although the invention is not limited in this respect, in some demonstrative embodiments of the invention, boot code 130 when executed by host processor 104 may result in causing host processor 104 to wait at least until the value of indicator 118 is set; and/or to read the value of indicator 118 e.g., as described below with reference to FIG. 2. For example, boot code 130 when executed by host processor 104, may cause host processor to read the contents of the predefined indicator address.

Although the invention is not limited in this respect, according to some demonstrative embodiments of the invention, indicator 118, authentication value 120, authentication value 122, authentication value 124, and/or authentication value 126 may be maintained in memory 128. In other embodiments of the invention indicator 118, authentication value 120, authentication value 122, authentication value 124, and/or authentication value 126 may be securely maintained by module 106, controller 116, and/or any other suitable element or unit of module 106, e.g., using any suitable protection and/or encryption configuration, arrangement and/or method as are known in the art. In some demonstrative embodiments of the invention, controller 116 may maintain controller code 117, including code which when executed by controller 116 may result in controller 116 performing one or more of the operations described herein. In other embodiments of the invention code 117 may be securely maintained by module 106, memory 128, and/or any other suitable element or unit of module 106, e.g., using any suitable protection and/or encryption configuration, arrangement and/or method as are known in the art.

Although the invention is not limited in this respect, according to some demonstrative embodiments of the invention, controller 116 may be able to selectively provide host processor 104 with a predefined code, which when executed by host apparatus 104 may result in host apparatus 104 waiting as long as the predefined code is provided to host processor 104. For example, controller 116 may selectively provide the predefined code to host processor 104 based on an authenticity of codes 130, 132, 134 and/or 136, e.g., as described below. The predefined code may include any suitable code, e.g., as is known in the art. For example, controller 116 may provide host processor 104 with a predefined, e.g., constant, output.

Figure 2:
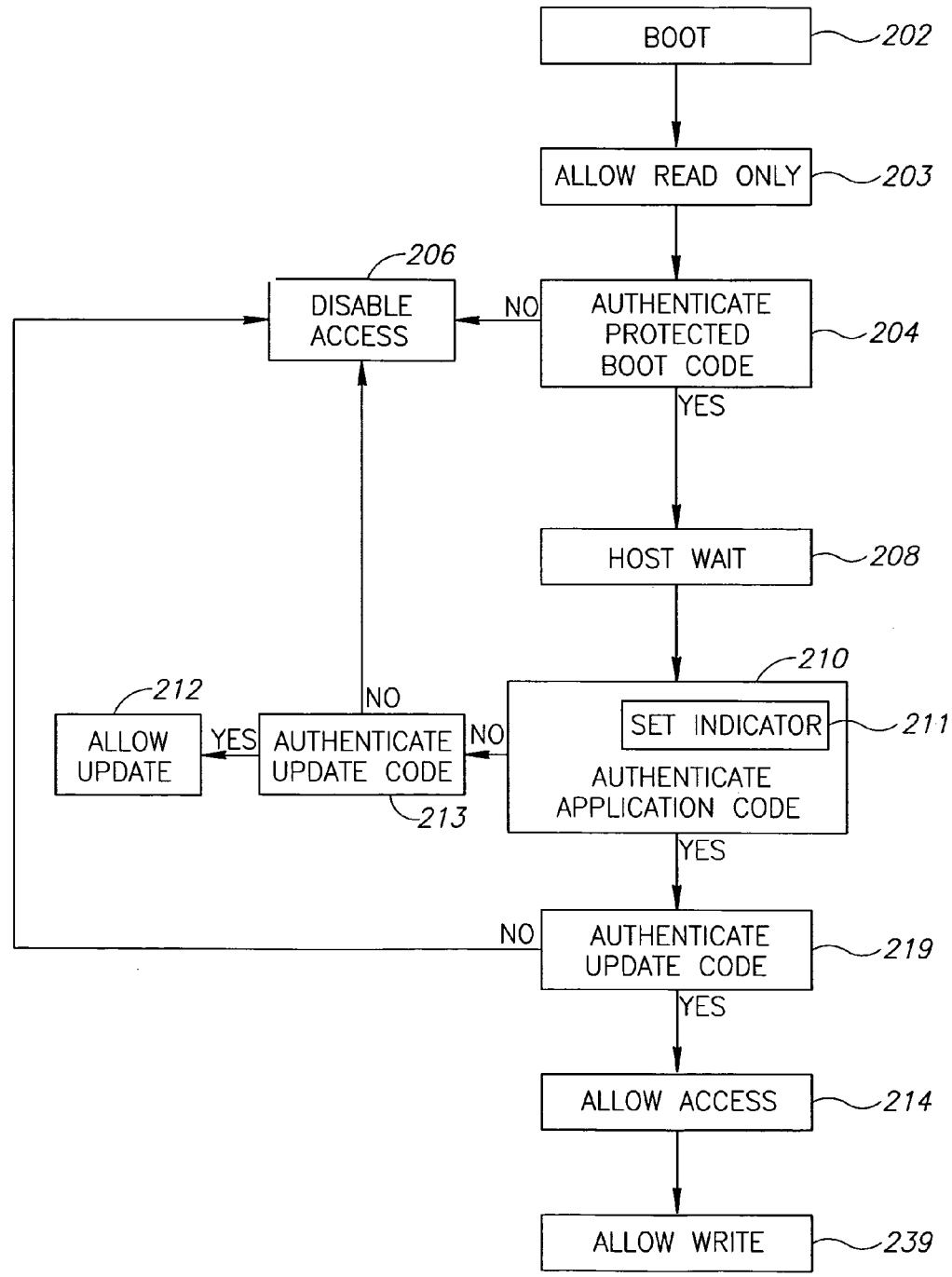
FIG. 2 is a schematic flowchart of a method of selectively allowing access to and/or execution of host-executable code according to one demonstrative embodiment of the invention.

Reference is now made to FIG. 2, which schematically illustrates a method of selectively allowing access to and/or execution of host-executable code according to one demonstrative embodiment of the invention. Although the invention is not limited in this respect, one or more operations of the method of FIG. 2 may be performed by host 102 (FIG. 1), host processor 104 (FIG. 1), protected module 106 (FIG. 1), and/or controller 116 (FIG. 1), e.g., to selectively allow access to and/or execution of host-executable code, e.g., including protected boot code 130 (FIG. 1) and application code 134 (FIG. 1), maintained in protected module 106 (FIG. 1).

As indicated at block 202, the method may include executing host-maintained boot code. For example, host processor 104, (FIG. 1) may execute host boot code 175 (FIG. 1), e.g., upon booting of host 102 (FIG. 1) and/or before performing any other operation. The method may also include executing controller boot code. For example, controller 116 (FIG. 1) may execute controller boot code, e.g., included in controller code 117 (FIG. 1).

As indicated at block 203, the method may also include enabling performing only a read operation to at least part of the host-executable code, e.g., at least until the boot code is authenticated, as described below with reference to block 204. For example, controller 116 (FIG. 1) may allow host processor 104 (FIG. 1) to perform only a read operation to at least boot code 130 (FIG. 1), e.g., until boot code 130 (FIG. 1) is authenticated.

As indicated at block 204 the method may also include authenticating the protected boot code. For example, controller 116 (FIG. 1) may authenticate boot code 130 based on boot authentication value 120 (FIG. 1), e.g., as described above. Although the invention is not limited in this respect, in some demonstrative embodiments of the invention authenticating the protected boot code may be performed during a time period at least partially overlapping a time period of executing the host boot code.

As indicated at block 206, the method may also include disabling access to the protected memory module, e.g., if the protected boot code is not determined to be authentic. For example, controller 116 (FIG. 1) may disable access to memory 128 (FIG. 1), e.g., by masking an output of protected memory module 106 (FIG. 1). For example, controller 116 (FIG. 1) may provide a predefined, e.g., constant, output to host processor 104 (FIG. 1), e.g., if boot code 130 (FIG. 1) is not determined to be authentic.

As indicated at block 210, the method may also include authenticating the application code. In one example, boot code 130 (FIG. 1) may include code that when executed by host processor 104 (FIG. 1), may result in causing controller 116 (FIG. 1) to authenticate application code 134 (FIG. 1). In another example, controller 116 (FIG. 1) may authenticate application code 134 (FIG. 1) after authenticating boot code 130, e.g., independently of any operation performed by host processor 104 (FIG. 1). Controller 116 (FIG. 1) may authenticate application code 134 (FIG. 1), for example, based on application code authentication value 122 (FIG. 1).

As indicated at block 211, the method may also include setting a validation indicator to indicate whether or not the application code is authentic. For example, controller 116 (FIG. 1) may set indicator 118 (FIG. 1) based on the authenticity of application code 134 (FIG. 1).

As indicated at block 208, the method may also include causing the host processor to wait at least until authenticating the application code, e.g., at least until the authenticity of the application code is determined. For example, boot code 130 (FIG. 1), when executed by host processor 104 (FIG. 1), may result in causing host processor 104 (FIG. 1) to wait at least until the value of indicator 118 (FIG. 1) is set.

As indicated at blocks 213 and/or 219, the method may also include authenticating the update code. For example, controller 116 (FIG. 1) may authenticate update code 132 (FIG. 1) based on update code authentication value 124 (FIG. 1).

In some demonstrative embodiments of the invention the method may include authenticating the update code after authenticating the application code. However, the invention is not limited in this respect and in other demonstrative embodiments the update code may be authenticated before the application code.

According to some demonstrative embodiments of the invention, setting the validation indicator, e.g., as described above with reference to block 211, may include setting the validation indicator based on the authenticity of both the application code and the update code. However, the invention is not limited in this respect, and in other embodiments setting the validation indicator may include setting the validation indicator based on the authenticity of only the application code.

As indicated at block 206, the method may include disabling access to the protected memory module, e.g., if the update code is not determined to be authentic.

As indicated at block 212, the method may include enabling updating the host-executable code, if the application code is not authentic and the update code is authentic. For example, boot code 130 (FIG. 1) when executed by host processor 104 (FIG. 1), may result in host processor 104 (FIG. 1) executing update code 132 (FIG. 1), e.g., if validity indicator 118 (FIG. 1) indicates that application code 134 (FIG. 1) is not authentic.

As indicated at block 214, the method may also include enabling execution of the application code, e.g., if both the application code and the update code are authentic. For example, boot code 130 (FIG. 1), when executed by host processor 104 (FIG. 1), may result in host processor 104 (FIG. 1) terminating the wait operation, and/or attempting to execute application code 134 (FIG. 1), e.g., if validity indicator 118 (FIG. 1) indicates that application code 134 (FIG. 1) is authentic. Controller 116 (FIG. 1) may allow host processor 104 (FIG. 1) to access and/or execute application code 134 (FIG. 1), e.g., if both application code 134 (FIG. 1) and update code 132 (FIG. 1) are authentic.

As indicated at block 239, although the invention is not limited in this respect, in some demonstrative embodiments of the invention the method may also include allowing a write operation to at least part of the host-executable code, e.g., if both the application code and update code are authentic. For example, controller 116 (FIG. 1) may allow host processor 104 (FIG. 1) to perform both read and write operations to codes 130, 132, 134 and/or 136 (FIG. 1). However, it will be appreciated that other embodiments of the invention may not include allowing the write operation, e.g., if both the application code and update code are authentic.

Figure 3:
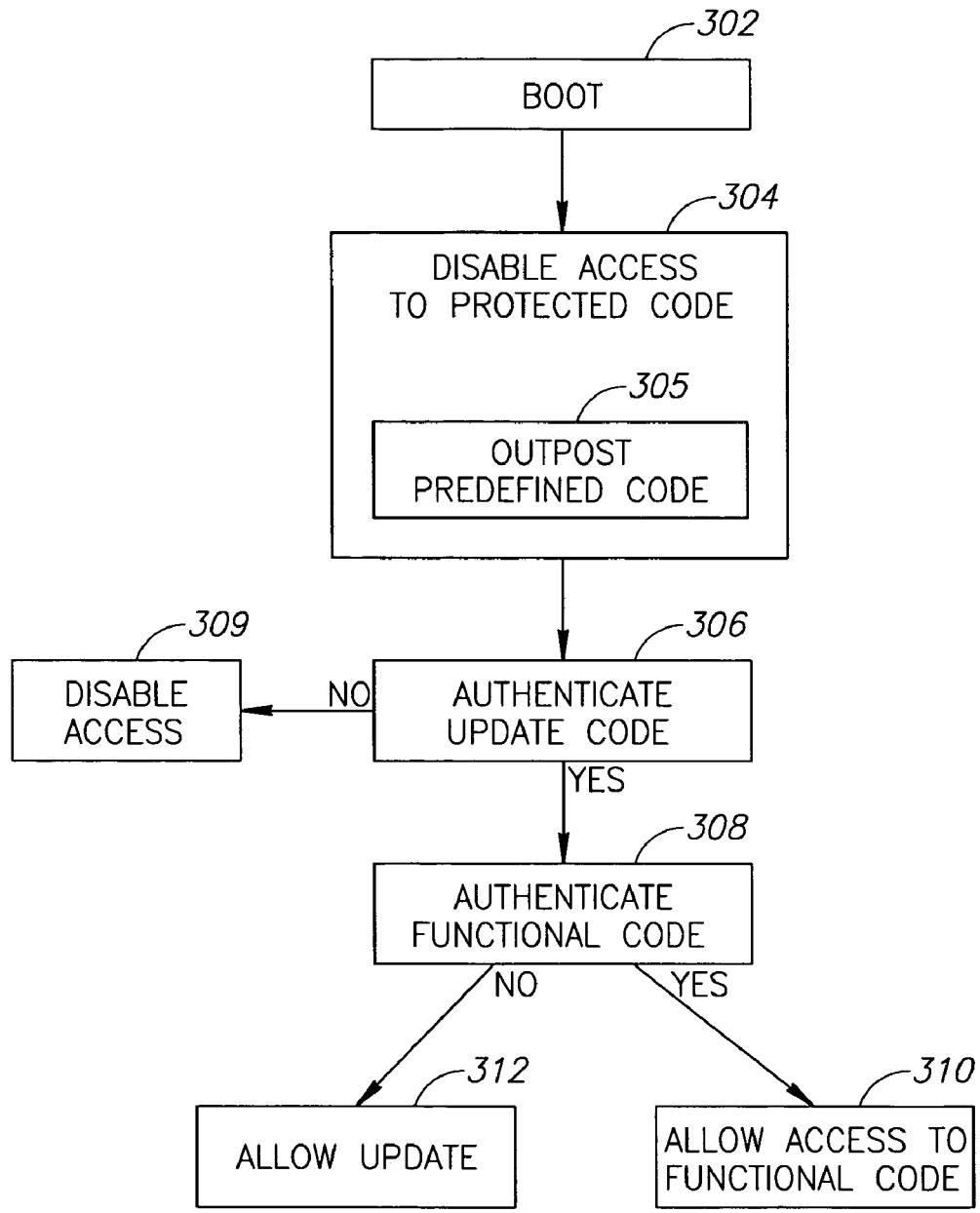
FIG. 3 is a schematic flowchart of a method of selectively allowing access to and/or execution of host-executable code according to another demonstrative embodiment of the invention.

Reference is now made to FIG. 3, which schematically illustrates a method of selectively enabling access to and/or execution of host-executable code according to another demonstrative embodiment of the invention. Although the invention is not limited in this respect, one or more operations of the method of FIG. 3 may be performed by host 102 (FIG. 1), host processor 104 (FIG. 1), protected module 106 (FIG. 1), and/or controller 116 (FIG. 1), e.g., to selectively allow access to and/or execution of host-executable code, e.g., including functional code 136 (FIG. 1) and update code 132 (FIG. 1), maintained in protected module 106 (FIG. 1).

As indicated at block 302, the method may include executing host boot code. For example, host processor 104 (FIG. 1) may execute host boot code 175 (FIG. 1), e.g., upon booting of host 102 (FIG. 1). The method may also include executing controller boot code. For example, controller 116 (FIG. 1) may execute controller boot code, e.g., included in controller code 117 (FIG. 1).

As indicated at block 308, the method may include authenticating the functional code. For example, controller 116 (FIG. 1) may authenticate functional code 136 (FIG. 1) based on functional code authentication value 126 (FIG. 1).

As indicated at block 310 the method may include allowing execution of the functional code, e.g., only if the functional code is authentic. For example, controller 116 (FIG. 1) may provide functional code 136 (FIG. 1) to host processor 104 (FIG. 1), e.g., only if controller 116 (FIG. 1) determines functional code 136 (FIG. 1) is authentic.

As indicated at block 306, the method may also include authenticating the update code. For example, controller 116 (FIG. 1) may authenticate update code 132 (FIG. 1) based on update code authentication value 124 (FIG. 1).

Although the invention is not limited in this respect, in some demonstrative embodiments of the invention authenticating the functional code and/or the update code may be performed during a time period at least partially overlapping a time period of executing the host boot code.

As indicated at block 309, the method may also include disabling access to the protected memory module, e.g., if the update code is not determined to be authentic. For example, controller 116 (FIG. 1) may disable access to memory 128 (FIG. 1), e.g., by masking an output of protected memory module 106 (FIG. 1). For example, controller 116 (FIG. 1) may provide a predefined, e.g., constant, output to host processor 104 (FIG. 1), e.g., if update code 132 (FIG. 1) is not authenticated.

As indicated at block 304, the method may also include disabling access to the host-executable code at least until the update code is authenticated, e.g., at least until both the update code and the functional code are authenticated. For example, as indicated at block 305, the method may include providing the host processor with only predefined code, which when executed by the host processor, may result in the host processor waiting at least until the functional code is authenticated. In one example, controller 116 (FIG. 1) may provide host processor 104 (FIG. 1) with any suitable code, e.g., as is known in the art, at least until update code 132 (FIG. 1) is authenticated. In one example, controller 116 (FIG. 1) may provide a predefined, e.g., constant, output to host processor 104 (FIG. 1), e.g., at least until update code 132 (FIG. 1) is authenticated.

As indicated at block 312, the method may include enabling updating the host-executable code, e.g., if the functional code is not authentic. For example, controller 116 (FIG. 1) may cause host processor 104 (FIG. 1) to execute update code 132 (FIG. 1), e.g., if functional code 136 (FIG. 1) is not authentic. Controller 116 (FIG. 1) may provide host processor 104 (FIG. 1), for example, with a branch command to an address of update code 132 (FIG. 1).

Figure 4:
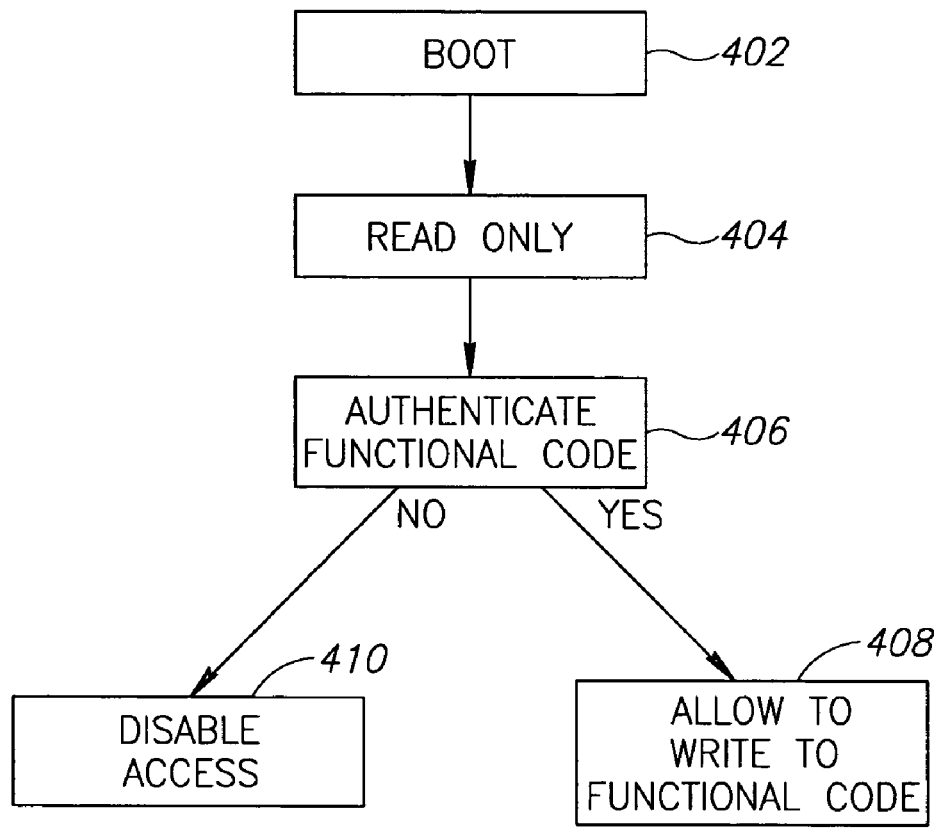
FIG. 4 is a schematic flowchart of a method of selectively allowing access to and/or execution of host-executable code according to yet another demonstrative embodiment of the invention.

Reference is now made to FIG. 4, which schematically illustrates a method of selectively allowing access to and/or execution of code according to yet another demonstrative embodiment of the invention. Although the invention is not limited in this respect, one or more operations of the method of FIG. 4 may be performed by host 102 (FIG. 1), host processor 104 (FIG. 1), protected module 106 (FIG. 1), and/or controller 116 (FIG. 1), e.g., to selectively allow access to and/or execution of host-executable code, e.g., including functional code 136 (FIG. 1), maintained in protected module 106 (FIG. 1).

As indicated at block 402, the method may include executing host boot code. For example, host processor 104 (FIG. 1) may execute host boot code 175 (FIG. 1), e.g., upon booting of host 102 (FIG. 1). The method may also include executing controller boot code. For example, controller 116 (FIG. 1) may execute controller boot code, e.g., included in controller code 117 (FIG. 1).

As indicated at block 406, the method may include authenticating the functional code. For example, controller 116 (FIG. 1) may authenticate functional code 136 (FIG. 1) based on functional code authentication value 126 (FIG. 1). Although the invention is not limited in this respect, in some demonstrative embodiments of the invention authenticating the functional code may be performed during a time period at least partially overlapping a time period of executing the host boot code.

As indicated at block 404, the method may include enabling only a read operation to the functional code at least until the functional code is authenticated. For example, controller 116 (FIG. 1) may allow host processor 104 (FIG. 1) only to read functional code 136 (FIG. 1), e.g., at least until controller 116 (FIG. 1) determines functional code 136 (FIG. 1) is authentic.

As indicated at block 408, the method may also include allowing to write to the functional code, e.g., if the functional code is authentic. For example, controller 116 (FIG. 1) may allow host processor 104 (FIG. 1) to perform a write operation to functional code 136 (FIG. 1), e.g., only if functional code 136 (FIG. 1) is authentic.

As indicated at block 410, the method may also include disabling access to the protected memory module, e.g., if the functional code is not determined authentic. For example, controller 116 (FIG. 1) may disable access to memory 128 (FIG. 1), e.g., by masking an output of protected memory module 106 (FIG. 1). For example, controller 116 (FIG. 1) may provide a predefined, e.g., constant, output to host processor 104 (FIG. 1), e.g., if update code 132 (FIG. 1) is not determined to be authentic.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A host apparatus comprising:
a host processor; and
a memory module, comprising:
   a memory to maintain a host-executable code to be executed by said host processor; and
   a security module comprising logic to authenticate said host-executable code and to selectively allow said host processor to access said host-executable code based on an authenticity of said host-executable code;
wherein said host-executable code is divided into at least two parts,
wherein said security module is adapted to verify the authenticity of said host-executable code,
   wherein said host processor is adapted to execute the code of a first part of said at least two parts while the portion of said memory that is used to store said first part of host-executable code is protected by said security module from having its contents modified by said host processor at least during the period at which said security module verifies said first part of host-executable code,
   wherein said verification is performable during a time period that is at least partially overlapping the time period at which said host processor executes said first part of said host executable code; and
   wherein said code in said first part includes one or more instructions that disable said host processor from executing code of other parts in said memory but the said first part until said security module signals that all said host-executable code is authentic.

2. The host apparatus of claim 1, wherein said security module is incorporated with said memory module on the same chipset.

3. The host apparatus of claim 1, wherein said security module limits access of said host processor to contents of said memory if said host-executable code is found by said security module to be non-authentic.

4. The host apparatus of claim 1, wherein:
said host-executable code contains update code that, when executed by said host processor, causes said host processor to change said host-executable code on said memory module;
said first part of said host-executable code contains one or more instructions that, when executed by said host processor, and when receiving an update signal from said security module, cause said host processor to execute said update code; and
said secure module indicates verified authenticity of said update code, by said update signal, to said host processor.

5. The apparatus of claim 1, wherein only the first of said parts of host-executable code contains any instructions.

6. The apparatus of claim 5 wherein said security module is incorporated with said memory module on the same chipset.

7. The apparatus of claim 5 wherein said security module limits access of said host processor to contents of said memory, if said host-executable code is found by said security module to be non-authentic.

8. A host apparatus comprising:
a host processor;
a memory module comprising a memory to maintain a host-executable code to be executed by said host processor; and
a security module comprising logic to authenticate said host-executable code and to selectively allow said host processor to access said host-executable code based on an authenticity of said host-executable code,
wherein:
   said host-executable code is adapted to contain update code that, when executed by said host processor, causes said host processor to change said host-executable code on said memory module, said update code is different from said host-executable code;
   said security module to verify the authenticity of said host-executable code;
   said security module to verify the authenticity of said update code;
   said security module is adapted to send data to said host processor during the process of said verification, that causes said host processor to wait until said verification processes complete; and
   if host-executable code was determined by said verification process to be non-authentic and said update code was determined by said verification process to be authentic, then said security module sends data to said host processor, wherein said data causes said host processor to execute said update code.

9. A method of selectively allowing a host processor to access a host-executable code, said method comprising:
storing host-executable code on a memory module;
allowing a security module to selectively allow a host processor to access said host-executable code, comprising:
   dividing said host-executable code into at least two parts;
   allowing said security module to verify the authenticity of said host-executable code;
   allowing said security module to restrict access of said host processor to said first part of host-executable code to read-only access while authenticity of said first part of host-executable code is being verified by said security module;
   allowing said host processor to execute at least a portion of the code of said first part during a time period that is at least partially overlapping the time period at which said security module carries out said verification; and
   allowing said first part of host-executable code to contain one or more instructions that, when executed by said host processor, cause said host processor to not execute code of other parts but the said first part before said security module signals that all said host-executable code is authentic.

10. The method of claim 9 wherein said security module limits access of said host processor to contents of said memory, if said host-executable code is found by said security module to be non-authentic.

11. The method of claim 9 further comprising:
allowing host-executable code to contain update code that, when executed by said host processor, causes said host processor to change said host-executable code on said memory module;
allowing said first part of said host-executable code to contain one or more instructions that, when executed by said host processor and when an update signal from said security module is received, cause said host processor to execute said update code; and
allowing said secure module to indicate the verified authenticity of said update code, using said update signal, to said host processor.

12. The method of claim 9, wherein only the first of said parts of host-executable code contains any instructions.

13. The method of claim 12 wherein said security module causes limitation to the functionality of said host processor, by limiting access of said host processor to contents of said memory if said host-executable code is found by said security module to be non-authentic.

14. A method of selectively allowing a host processor to access a host-executable code, said method comprising:
- storing host-executable code on a memory module;
- storing update code that, when executed by said host processor, causes said host processor to change said host-executable code on said memory module said update code is different from said host-executable code;
- allowing said security module to selectively allow said host processor to access said host-executable code, comprising:
  - allowing said security module to verify the authenticity of said host-executable code;
- allowing said security module to verify the authenticity of said update code;
- allowing said security module to send data to said host processor, during said verification process wherein said data causing said host processor to wait until said verification process completes; and
- allowing said security module to carry out a decision process once verification process completes, wherein:
- if said host-executable code was found by said verification process to be non-authentic and said update code was found by said verification process to be authentic, then said decision process results in allowing said security module to send data to said host processor wherein said data causes said host processor to execute said update code; and
- if said host-executable code was found by said verification process to be authentic, then said decision process results in allowing said host processor to execute said host-executable code.

\* \* \* \* \*